United States Patent
Karmakar

(10) Patent No.: US 12,051,040 B2
(45) Date of Patent: Jul. 30, 2024

(54) DISTRIBUTED SENSOR SYSTEM AND METHOD FOR INVENTORY MANAGEMENT AND PREDICTIVE REPLENISHMENT

(71) Applicant: Walmart Apollo, LLC, Bentonville, AR (US)

(72) Inventor: Somedip Karmakar, Kolkata (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/845,164

(22) Filed: Jun. 21, 2022

(65) Prior Publication Data

US 2022/0318737 A1     Oct. 6, 2022

Related U.S. Application Data

(63) Continuation of application No. 15/891,005, filed on Feb. 7, 2018, now abandoned.

(30) Foreign Application Priority Data

Nov. 18, 2017   (IN) .............................. 201711041326

(51) Int. Cl.
    *G06Q 10/087*      (2023.01)
    *G06Q 30/0201*     (2023.01)
    *G06Q 30/0202*     (2023.01)

(52) U.S. Cl.
CPC ....... *G06Q 10/087* (2013.01); *G06Q 30/0201* (2013.01); *G06Q 30/0202* (2013.01)

(58) Field of Classification Search
None
See application file for complete search history.

(56) References Cited

U.S. PATENT DOCUMENTS

| | | |
|---|---|---|
| 3,741,345 A | 6/1973 | Saridis |
| 5,497,314 A | 3/1996 | Novak |
| | (Continued) | |

FOREIGN PATENT DOCUMENTS

| | | | | |
|---|---|---|---|---|
| CA | 3041339 A1 * | 7/2018 | ........... | A43B 3/0005 |
| CA | 3041339 A1 | 7/2018 | | |
| | (Continued) | | | |

OTHER PUBLICATIONS

Marina Paolanti et al, "Modelling and Forecasting Customer Navigation in Intelligent Retail Environments," Oct. 6, 2017, J Intell Robot Syst, Ver 91, pp. 165-180 (Year: 2017).*

(Continued)

*Primary Examiner* — Amanda Gurski
(74) *Attorney, Agent, or Firm* — Fitch, Even, Tabin & Flannery LLP

(57) ABSTRACT

An system and a method for scoring products viewed by a user prior to making a purchase decision and also identify the products considered most before ultimately purchasing. The system uses sensors placed on the shelves to identify the item viewed before making a purchase decision and also track the time spent per decision. The tracking will allow viewed and ultimately bought scores and item similarity scores to be determined. The scores in conjunction with point-of-sale terminal data to identify times determinative of users' interest levels prior to a purchase. The system predicatively replenishes inventory of high interest items based on historical patterns of interest and historical point-of-sale terminal data.

14 Claims, 8 Drawing Sheets

(56) References Cited

U.S. PATENT DOCUMENTS

| | | | |
|---|---|---|---|
| 5,671,362 A | 9/1997 | Cowe | |
| 5,969,755 A | 10/1999 | Courtney | |
| 6,412,694 B1 | 7/2002 | Kumar | |
| 6,424,370 B1 | 7/2002 | Courtney | |
| 6,628,835 B1 | 9/2003 | Brill | |
| 6,659,344 B2 | 12/2003 | Otto | |
| 6,909,356 B2 | 6/2005 | Brown | |
| 6,915,135 B1 | 7/2005 | McKee | |
| 7,227,893 B1 | 6/2007 | Srinivasa | |
| 7,518,068 B2 | 4/2009 | Green | |
| 7,522,057 B2 | 4/2009 | Stern | |
| 7,596,426 B2 | 9/2009 | McGrady | |
| 7,603,291 B2* | 10/2009 | Raiyani | G06Q 30/02 705/26.7 |
| 7,650,298 B2 | 1/2010 | Godlewski | |
| 7,760,908 B2 | 7/2010 | Curtner | |
| 7,775,130 B2 | 8/2010 | Harish | |
| 7,780,081 B1 | 8/2010 | Liang | |
| 7,903,141 B1 | 3/2011 | Mariano | |
| 8,009,863 B1* | 8/2011 | Sharma | G06Q 30/02 382/107 |
| 8,091,782 B2 | 1/2012 | Cato | |
| 8,264,422 B1 | 9/2012 | Persson | |
| 8,299,920 B2 | 10/2012 | Hamm | |
| 8,325,036 B1 | 12/2012 | Fuhr | |
| 8,380,558 B1 | 2/2013 | Sharma | |
| 8,538,820 B1 | 9/2013 | Migdal | |
| 8,577,705 B1 | 11/2013 | Baboo | |
| 8,594,482 B2 | 11/2013 | Fan | |
| 8,695,878 B2 | 4/2014 | Burnside | |
| 8,720,778 B2 | 5/2014 | Chen | |
| 8,810,392 B1 | 8/2014 | Teller | |
| 8,817,094 B1 | 8/2014 | Brown | |
| 8,866,612 B1 | 10/2014 | Foster | |
| 8,908,903 B2 | 12/2014 | Deng | |
| 9,020,264 B2 | 4/2015 | Maeda | |
| 9,024,755 B2 | 5/2015 | Fuhr | |
| 9,026,941 B1 | 5/2015 | Krueger | |
| 9,082,149 B2 | 7/2015 | Argue | |
| 9,123,018 B2 | 9/2015 | Gentile | |
| 9,124,778 B1 | 9/2015 | Crabtree | |
| 9,165,278 B2 | 10/2015 | Vasantham | |
| 9,367,770 B2 | 6/2016 | Footen | |
| 9,396,490 B1 | 7/2016 | Marx | |
| 9,659,272 B2 | 5/2017 | Birch | |
| 9,659,275 B2 | 5/2017 | Jones | |
| 9,740,937 B2 | 8/2017 | Zhang | |
| 9,747,497 B1 | 8/2017 | Sharma | |
| 9,813,607 B2 | 11/2017 | Kalevo | |
| 9,816,148 B2 | 11/2017 | Umansky | |
| 9,911,290 B1 | 3/2018 | Zalewski | |
| 9,916,561 B2 | 3/2018 | Marathe | |
| 10,129,507 B2 | 11/2018 | Landers, Jr. | |
| 10,262,294 B1 | 4/2019 | Hahn | |
| 10,268,983 B2 | 4/2019 | Kumar | |
| 10,304,053 B1 | 5/2019 | Templeton | |
| 10,339,493 B1 | 7/2019 | Famularo | |
| 10,438,157 B2 | 10/2019 | Heier | |
| 10,552,791 B2 | 2/2020 | Brooks | |
| 2002/0113123 A1 | 8/2002 | Otto | |
| 2002/0170961 A1 | 11/2002 | Dickson | |
| 2003/0015585 A1 | 1/2003 | Wike | |
| 2003/0216969 A1 | 11/2003 | Bauer | |
| 2004/0103034 A1 | 5/2004 | Reade | |
| 2004/0168172 A1 | 8/2004 | Masuda | |
| 2005/0073585 A1 | 4/2005 | Ettinger | |
| 2005/0105765 A1 | 5/2005 | Han | |
| 2005/0131578 A1 | 6/2005 | Weaver | |
| 2005/0169367 A1 | 8/2005 | Venetianer | |
| 2005/0185823 A1 | 8/2005 | Brown | |
| 2005/0189412 A1 | 9/2005 | Hudnut | |
| 2005/0200476 A1 | 9/2005 | Forr | |
| 2006/0032915 A1 | 2/2006 | Schwartz | |
| 2006/0071774 A1 | 4/2006 | Brown | |
| 2006/0243798 A1 | 11/2006 | Kundu | |
| 2006/0251339 A1 | 11/2006 | Gokturk | |
| 2006/0256082 A1 | 11/2006 | Cho | |
| 2007/0016494 A1* | 1/2007 | Brown | G06Q 10/087 705/28 |
| 2007/0143188 A1 | 6/2007 | Kelley | |
| 2007/0179921 A1 | 8/2007 | Zitnick | |
| 2007/0182818 A1 | 8/2007 | Buehler | |
| 2007/0257985 A1 | 11/2007 | Estevez | |
| 2008/0011836 A1 | 1/2008 | Adema | |
| 2008/0018738 A1 | 1/2008 | Lipton | |
| 2008/0035727 A1 | 2/2008 | Stanzel | |
| 2008/0055194 A1 | 3/2008 | Baudino | |
| 2008/0059570 A1 | 3/2008 | Bill | |
| 2008/0100704 A1 | 5/2008 | Venetianer | |
| 2008/0130948 A1 | 6/2008 | Ozer | |
| 2008/0130951 A1 | 6/2008 | Wren | |
| 2008/0159634 A1 | 7/2008 | Sharma | |
| 2008/0193010 A1 | 8/2008 | Eaton | |
| 2008/0198231 A1 | 8/2008 | Ozdemir | |
| 2008/0221943 A1 | 9/2008 | Porter | |
| 2008/0226129 A1 | 9/2008 | Kundu | |
| 2008/0230603 A1 | 9/2008 | Stawar | |
| 2008/0260212 A1 | 10/2008 | Moskal | |
| 2008/0303901 A1 | 12/2008 | Variyath | |
| 2008/0308630 A1 | 12/2008 | Bhogal | |
| 2009/0039165 A1 | 2/2009 | Collins, Jr. | |
| 2009/0055278 A1 | 2/2009 | Nemani | |
| 2009/0059270 A1 | 3/2009 | Opalach | |
| 2009/0063306 A1 | 3/2009 | Fano | |
| 2009/0083122 A1 | 3/2009 | Angell | |
| 2009/0101713 A1 | 4/2009 | Ulrich | |
| 2009/0121017 A1 | 5/2009 | Cato | |
| 2009/0125406 A1 | 5/2009 | Lewis | |
| 2009/0140046 A1 | 6/2009 | Landers, Jr. | |
| 2009/0145965 A1 | 6/2009 | Davis | |
| 2009/0228363 A1 | 9/2009 | Segev | |
| 2009/0232366 A1 | 9/2009 | Okochi | |
| 2009/0259571 A1 | 10/2009 | Ebling | |
| 2009/0302106 A1 | 12/2009 | Satou | |
| 2010/0002082 A1 | 1/2010 | Buehler | |
| 2010/0013931 A1 | 1/2010 | Golan | |
| 2010/0019905 A1 | 1/2010 | Boddie | |
| 2010/0026802 A1 | 2/2010 | Titus | |
| 2010/0060455 A1 | 3/2010 | Frabasile | |
| 2010/0070365 A1 | 3/2010 | Siotia | |
| 2010/0082301 A1 | 4/2010 | Skibiski | |
| 2010/0117959 A1 | 5/2010 | Hong | |
| 2010/0138037 A1 | 6/2010 | Adelberg | |
| 2010/0141386 A1 | 6/2010 | Kim | |
| 2010/0250305 A1 | 9/2010 | Lee | |
| 2010/0259931 A1 | 10/2010 | Chemel | |
| 2010/0277277 A1 | 11/2010 | Green | |
| 2010/0318440 A1 | 12/2010 | Coveley | |
| 2011/0102588 A1 | 5/2011 | Trundle | |
| 2011/0115914 A1 | 5/2011 | Bailey | |
| 2011/0140380 A1 | 6/2011 | Ulrich | |
| 2011/0153466 A1 | 6/2011 | Harish | |
| 2011/0222727 A1 | 9/2011 | Sharma | |
| 2011/0228984 A1 | 9/2011 | Papke | |
| 2011/0234840 A1 | 9/2011 | Klefenz | |
| 2011/0242025 A1 | 10/2011 | Wen | |
| 2011/0280547 A1 | 11/2011 | Fan | |
| 2011/0295644 A1 | 12/2011 | Hara | |
| 2011/0320322 A1 | 12/2011 | Roslak | |
| 2012/0080517 A1 | 4/2012 | Braunstein | |
| 2012/0226556 A1 | 9/2012 | Itagaki | |
| 2012/0284132 A1 | 11/2012 | Kim | |
| 2012/0310727 A1 | 12/2012 | Bradley | |
| 2012/0310757 A1 | 12/2012 | Kim | |
| 2013/0046644 A1 | 2/2013 | Sano | |
| 2013/0076898 A1 | 3/2013 | Philippe | |
| 2013/0077820 A1 | 3/2013 | Marais | |
| 2013/0110565 A1 | 5/2013 | Means, Jr. | |
| 2013/0117053 A2* | 5/2013 | Campbell | G06Q 10/087 705/7.11 |
| 2013/0154804 A1 | 6/2013 | Jung | |
| 2013/0182904 A1 | 7/2013 | Zhang | |
| 2013/0197968 A1 | 8/2013 | Davis | |
| 2013/0208115 A1 | 8/2013 | Park | |

(56) References Cited

U.S. PATENT DOCUMENTS

| | | |
|---|---|---|
| 2013/0216094 A1 | 8/2013 | Delean |
| 2013/0223673 A1 | 8/2013 | Davis |
| 2013/0250115 A1 | 9/2013 | Fan |
| 2013/0265232 A1 | 10/2013 | Yun |
| 2013/0290106 A1 | 10/2013 | Bradley |
| 2013/0320085 A1 | 12/2013 | Chen |
| 2013/0322686 A1 | 12/2013 | Kritt |
| 2013/0342316 A1 | 12/2013 | Ghaffari |
| 2014/0001258 A1 | 1/2014 | Chan |
| 2014/0050455 A1 | 2/2014 | Ni |
| 2014/0052555 A1 | 2/2014 | MacIntosh |
| 2014/0132728 A1 | 5/2014 | Verano |
| 2014/0164176 A1 | 6/2014 | Kitlyar |
| 2014/0195374 A1 | 7/2014 | Bassemir |
| 2014/0201025 A1 | 7/2014 | Adoni |
| 2014/0201039 A1 | 7/2014 | Harwell |
| 2014/0201041 A1 | 7/2014 | Meyer |
| 2014/0201042 A1 | 7/2014 | Meyer |
| 2014/0222501 A1 | 8/2014 | Hirakawa |
| 2014/0240088 A1 | 8/2014 | Robinette |
| 2014/0293032 A1 | 10/2014 | Gontina |
| 2014/0304123 A1 | 10/2014 | Schwartz |
| 2014/0324527 A1* | 10/2014 | Kulkarni ............ G06Q 30/0261 705/7.29 |
| 2014/0351098 A1 | 11/2014 | Shafer |
| 2014/0365334 A1 | 12/2014 | Hurewitz |
| 2014/0365336 A1 | 12/2014 | Hurewitz |
| 2014/0379296 A1 | 12/2014 | Nathan |
| 2015/0006319 A1 | 1/2015 | Thomas |
| 2015/0012426 A1 | 1/2015 | Purves |
| 2015/0019391 A1 | 1/2015 | Kumar |
| 2015/0029339 A1 | 1/2015 | Kobres |
| 2015/0039458 A1 | 2/2015 | Reid |
| 2015/0041616 A1 | 2/2015 | Gentile |
| 2015/0088703 A1 | 3/2015 | Yan |
| 2015/0117703 A1 | 4/2015 | Peng |
| 2015/0180543 A1* | 6/2015 | Verma ...................... H04B 5/72 455/41.1 |
| 2015/0199698 A1 | 7/2015 | Yoshitake |
| 2015/0206188 A1 | 7/2015 | Tanigawa |
| 2015/0206335 A1 | 7/2015 | Hugel |
| 2015/0235161 A1 | 8/2015 | Azar |
| 2015/0269549 A1 | 9/2015 | Herring |
| 2015/0310447 A1 | 10/2015 | Shaw |
| 2015/0324635 A1 | 11/2015 | Tanaka |
| 2015/0348060 A1 | 12/2015 | Ogawa |
| 2016/0026032 A1* | 1/2016 | Moore ..................... G06F 3/147 349/1 |
| 2016/0027029 A1* | 1/2016 | Poole ................... G06Q 10/087 705/7.34 |
| 2016/0048798 A1 | 2/2016 | Meyer |
| 2016/0055555 A1 | 2/2016 | Mills |
| 2016/0071052 A1 | 3/2016 | Henry |
| 2016/0110703 A1 | 4/2016 | Herring |
| 2016/0125265 A1 | 5/2016 | Xie |
| 2016/0132910 A1* | 5/2016 | Appel ................ G06Q 30/0202 705/7.31 |
| 2016/0180670 A1 | 6/2016 | Swope |
| 2016/0189277 A1 | 6/2016 | Davis |
| 2016/0203499 A1* | 7/2016 | Yamashita ............. G06V 20/52 705/7.29 |
| 2016/0224857 A1 | 8/2016 | Zhang |
| 2016/0260161 A1 | 9/2016 | Atchley |
| 2016/0300246 A1 | 10/2016 | Apokatanidis |
| 2016/0328767 A1 | 11/2016 | Bonner |
| 2016/0335667 A1 | 11/2016 | Aubrey |
| 2016/0379225 A1 | 12/2016 | Rider |
| 2017/0039613 A1 | 2/2017 | Kaehler |
| 2017/0083887 A1 | 3/2017 | Volta |
| 2017/0177969 A1 | 6/2017 | Zaremski |
| 2017/0186072 A1 | 6/2017 | Clark |
| 2017/0193434 A1 | 7/2017 | Shah |
| 2017/0249587 A1* | 8/2017 | Jones ................... G06Q 10/087 |
| 2017/0318422 A1 | 11/2017 | Kokkonen |
| 2017/0344832 A1 | 11/2017 | Leung |
| 2017/0373775 A1* | 12/2017 | Daoura .................... H04W 4/80 |
| 2018/0075427 A1 | 3/2018 | Greenberger |
| 2018/0096566 A1 | 4/2018 | Blair, II |
| 2018/0114184 A1 | 4/2018 | Brooks |
| 2018/0181906 A1 | 6/2018 | Baduge |
| 2018/0182491 A1* | 6/2018 | Belliveau ............ A61M 5/1723 |
| 2018/0253604 A1 | 9/2018 | Hiramatsu |
| 2018/0260868 A1 | 9/2018 | Peterson |
| 2018/0260877 A1 | 9/2018 | Li |
| 2019/0156270 A1 | 5/2019 | Karmakar |
| 2019/0156394 A1 | 5/2019 | Karmakar |

FOREIGN PATENT DOCUMENTS

| | | |
|---|---|---|
| EP | 1901215 | 3/2008 |
| WO | 2001067356 | 9/2001 |
| WO | 2018080977 | 5/2018 |
| WO | 2019099796 | 5/2019 |
| WO | 2019099854 | 5/2019 |

OTHER PUBLICATIONS

Carlos Ruiz et al, "AIM3S: Autonomous Inventory Monitoring through Multi-Modal Sensing for Cashier-Less Convenience Stores," Nov. 14, 2019, Association for Computing Machinery, pp. pp. 135-144 (Year: 2019).*

A. M. Khan, A. Khaparde and V.P. Savanur, "Self-aware inventory system based on RFID, sensors and IBM security directory integrator," 2016 International Conference on Inventive Computation Technologies (ICICT), 2016, pp. 1-4, doi: 10.1109/INVENTIVE 2016.7976074. (Year: 2016).

Ari Juels, RFID Security and Privacy: A Research Study, Feb. 2, 2006, IEEE Journal on Selected Areas in Communications, vol. 24, No. 2, pp. 381-394 (Year: 2006).

Article Source: The Tell-Tale Look: Viewing Time, Preferences, and Prices Gunia BC, Murnighan JK (2015) The Tell-Tale Look: Viewing Time, Preferences, and Prices. PLOS One 10(1): e0117137. https:// doi.org/10.1371/journal.pone.0117137 (Year: 2015).

Big Data Offers Big Benefits for Retailers, KDM Pop Soilutions Group, KDM Blog, Posted Friday May 30, 2014.

Big Data Plus Brick and Mortar Stores #infographic, http://www.visualistan.com/2014/05/bigdataplusbrickandmortarstores.html, last viewed Mar. 22, 2017.

C. Jie, W. Dong and L. Canquan, "Recommendation system technologies of intelligent large-scale shopping mall," Proceedings of 2012 2nd International Conference on Computer Science and Network Technology, 2012, pp. 1058-1062, doi: 10.1109/ICCSNT 2012.6526108. (Year: 2012).

D. Li, G. Zhao, Z. Wang, W. Ma and Y. Liu, "A Method of Purchase Prediction Based on User Behavior Log," 2015 IEEE International Conference on Data Mining Workshop (ICDMW), 2015, pp. 1031-1039, doi: 10.1109/ICDMW.2015.179 (Year: 2015).

E. Frontoni, A. Mancini and P. Zingaretti, "Real time out of shelf detection using embedded sensor network," 2014 IEEE/ASME 10th International Conference on Mechatronic and Embedded Systems and Applications (MESA), 2014, pp. 1-6, doi: 10.1109/MESA 2014.6935614. (Year: 2014).

Hwangbo, Hyunwoo et al., Use of the Smart Store for Persuasive Marketing and Immersive Customer Experiences: A case Study of Korean Apparel Enterprise, Mobile Information Systems, vol. 2017 (2017), Article ID 4738340, 17 pages.

I. A. Burhanuddin, P. Bajaj, S. Shekhar, D. Mukherjee, A. Raj and A. Sankar, "Similarity Learning for Product Recommendation and Scoring Using Multi-channel Data," 2015 IEEE International Conference on Data Mining Workshop (ICDMW), 2015, pp. 1143-1152, doi: 10.1109/ICDMW.2015.139. (Year: 2015).

International Search Report and Written Opinion from related International Patent Application No. PCT/US18/61477 mailed Jan. 29, 2019.

International Search Report and Written Opinion from related International Patent Application No. PCT/US18/61554 issued Feb. 7, 2019.

(56) References Cited

OTHER PUBLICATIONS

J. Villegas and S. Saito, "Assisting system for grocery shopping navigation and product recommendation," 2017 IEEE 6th Global Conference on Consumer Electronics (GCCE), 2017, pp. 1-4, doi: 10.1109/GCCE.2017.8229387. ( (Year: 2017).
M. Marder. "Using Image Analytics to Monitor Retail Store Shelves." IBM journal of research and development 59.2/3 (2015): n. pag Web. (Year: 2015).
PCT; App. No. PCT/US2017/057834; International Preliminary Report on Patentability mailed May 9, 2019.
PCT; App. No. PCT/US2017/057834; International Search Report and Written Opinion mailed Jan. 4, 2018.
PCT; App. No. PCT/US2018/061477; International Preliminary Report on Patentability mailed May 19, 2020.
PCT; App. No. PCT/US2018/061554; International Preliminary Report on Patentability mailed May 19, 2020.
U.S. Appl. No. 15/790,305; Notice of Allowance mailed Oct. 1, 2019; (pp. 1-11).
U.S. Appl. No. 15/790,305; Office Action mailed Mar. 19, 2019; (pp. 1-14).
U.S. Appl. No. 15/790,305; Office Action mailed Oct. 30, 2018; (pp. 1-13).
U.S. Appl. No. 15/890,999; Notice of Allowance and Fees Due (PTOL-85) mailed May 11, 2022; (pp. 1-8).
U.S. Appl. No. 15/890,999; Notice of Allowance mailed Apr. 12, 2021; (pp. 1-5).
U.S. Appl. No. 15/890,999; Office Action mailed Feb. 28, 2020.
U.S. Appl. No. 15/890,999; Office Action mailed Aug. 18, 2020.
U.S. Appl. No. 15/891,005; Non-Final Rejection mailed Oct. 20, 2021; (pp. 1-18).
U.S. Appl. No. 15/891,005; Notice of Allowance and Fees Due (PTOL-85) mailed Mar. 22, 2022; (pp. 1-9).
U.S. Appl. No. 15/891,005; Notice of Allowance mailed Jul. 28, 2021; (pp. 1-7).
U.S. Appl. No. 15/891,005; Office Action mailed Feb. 10, 2021.
U.S. Appl. No. 15/891,005; Office Action mailed May 27, 2020.
U.S. Appl. No. 15/891,005; Office Action mailed Jun. 2, 2021; (pp. 1-19).
U.S. Appl. No. 15/891,005; Office Action mailed Oct. 15, 2020.
Y. Chen, J. Zhang, M. Guo and J. Cao, "Learning User Preference from Heterogeneous Information for Store-Type Recommendation," in IEEE Transactions on Services Computing, vol. 13, No. 6, pp. 1100-1114, Nov. 1-Dec. 2020, doi: 10.1109/ TSC.2017. 2755009. (Year: 2020).

* cited by examiner

DISTRIBUTED SENSOR SYSTEM AND METHOD FOR INVENTORY MANAGEMENT AND PREDICTIVE REPLENISHMENT

RELATED APPLICATIONS

This application is a continuation of U.S. application Ser. No. 15/891,005, filed Feb. 7, 2018, now abandoned, which claims priority to Indian Patent Application No. 201711041326 entitled "DISTRIBUTED SENSOR SYSTEMS AND METHODS FOR INVENTORY MANAGEMENT AND PREDICTIVE REPLENISHMENT," filed on Nov. 18, 2017, each of which is incorporated herein by reference in its entirety.

BACKGROUND

Online shopping the shopping pattern and buying behavior of the users are easily understood by tracking the similar items viewed and the product ultimately bought through session tracking. The viewed and ultimately bought (VUB) scores can be used to determine suitable substitute items. The viewed and also viewed scores help in determining similar items or complements. Also the list of items viewed together before making a shopping decision helps in better understanding of the product attributes a user is looking at before buying a product. Through these scores, the key attributes leading to a purchase can be determined which can help us to better understand the market trend and improve our assortment. Unfortunately, such scores are unavailable at a retail store level.

BRIEF DESCRIPTION OF DRAWINGS

Illustrative embodiments are shown by way of example in the accompanying drawings and should not be considered as a limitation of the present disclosure.

DETAILED DESCRIPTION

Described in detail herein is an system for inventory management. The system for inventory management provides for the identification of which products are viewed by a user before making a purchase decision and also the identification of the products considered most before purchasing ultimately. Additionally, the system can utilize the identification of products considered most before purchasing ultimately to predictively manage inventor of the considered product.

Figure 1:
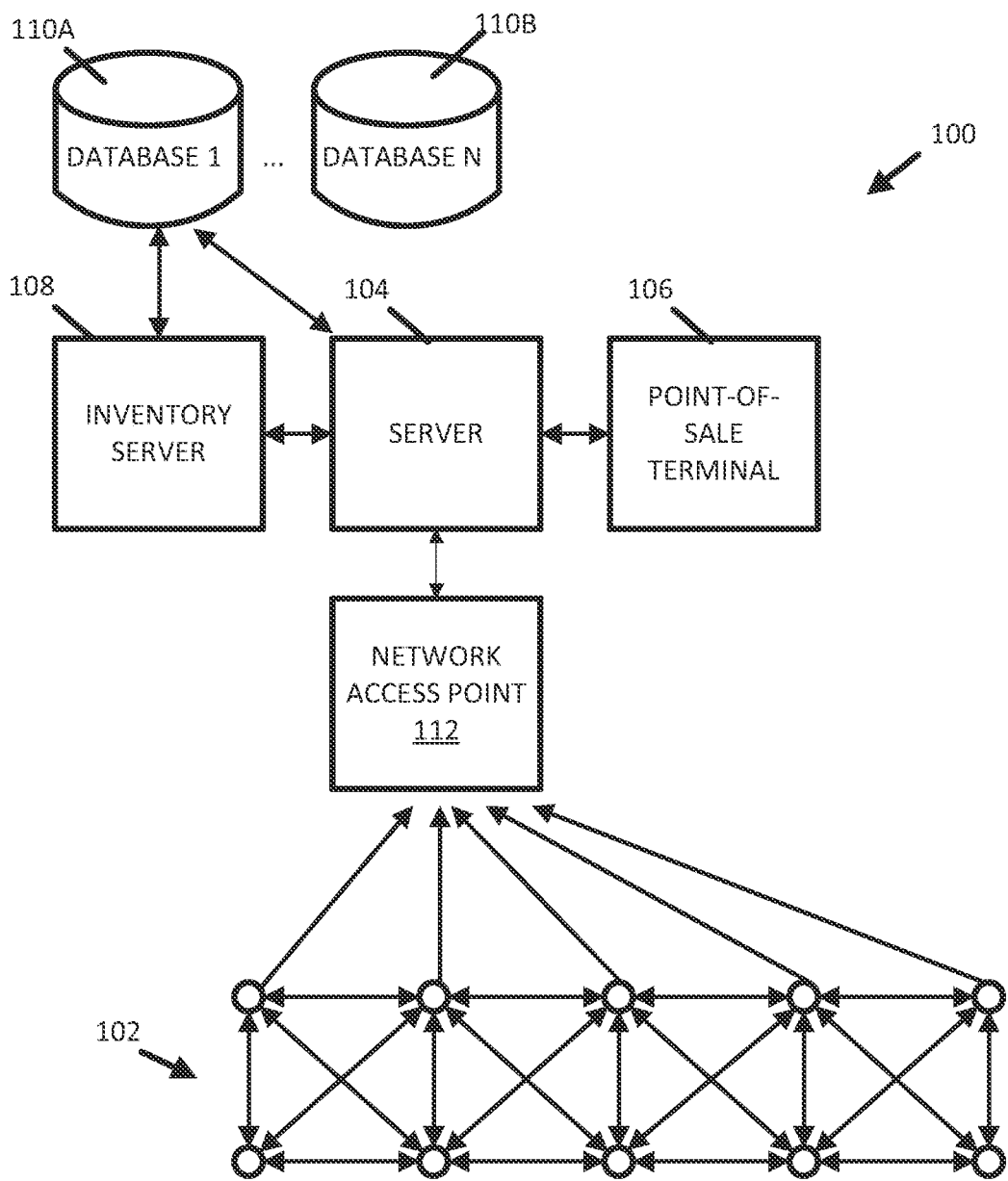
FIG. 1 is a block diagram illustrating a distributed sensor system according to an exemplary embodiment.

FIG. 1 is a block diagram illustrating a distributed sensor system 100 for controlling and managing inventory according to an exemplary embodiment. Embodiments of the system 100 can include an array of sensor modules 102, servers 104 and 108, one or more point-of-sale terminals 106, databases 110A, 110B, and at least one network access point 112.

Each sensor module in the array of sensor modules 102 can be considered a node and each sensor module in the array 102 can be in selective communication with adjacent or neighboring nodes in the array. The sensor modules can communicate with adjacent or neighboring nodes through wired and/or wireless communication. Communication support to facilitate communication between adjacent nodes in the array of sensors can include Bluetooth®, Zigbee, WiFi (e.g., as specified by IEEE 802.11a-n), near-field communications (NFC) or other comparable wireless communication stacks. Additionally, the array of sensors 102 can be implemented within an Internet of Things framework such as ioTivity or Zephyr, which support a development stack with underlying communication application programming interfaces (APIs) already implemented. The array of sensor modules 102 can be implemented with sensing elements such as optical sensors, acoustic sensors, weight sensors, radio-frequency identification (RFID), inductance sensors, capacitive sensors, cameras (e.g., CMOS imagers or CCD sensors) or a combination of these sensors.

The array of sensor modules 102 can be in selective communication with the server 104 via the network access point. The network access point is an electronic device that provides the sensor modules access to a network including the server 104. The network access point can route or relay data communications between devices in a network (e.g., between the sensor modules and the server 104). In exemplary embodiments of the network access point can be embodied as a relay, a router, a gateway, a hub, a server, a modem, or any other device suitable for facilitating connection of the sensor modules to the network and routing data communications between devices on the network. As a non-limiting example, the network access point can be a WiFi access point.

The server 104 receives data from the array of sensors modules 102 via the network access point 112. The data can include information relating to the placement/location of the sensor module(s) transmitting the data, information regarding objects detected by the sensor module(s), and other relevant data corresponding to the type of sensor(s) implemented by the sensor module(s) (e.g., images from an optical sensors, weights measurements from a weight sensor, data from an IR or acoustic sensor, etc.). The server 104 utilizes the data from the array of sensor modules 102 to determine user interest in an item placed near to the sensor. The server 104 can also determine attributes of items selected or, alternatively, not selected by a user, and provide recommendations on item placement to improve the likelihood of an item being selected The one or more point of sale terminals 106 facilitate transactions of viewed and selected items by the users. Point of sale terminals 106 transmit transaction data to the server to provide correlative data between items viewed by a user, time spent viewing an item by a user, and the purchasing of an item by a user.

The server 108 can be an inventory server that manages interaction between inventory and product databases 110A, 110B. The inventory server 108 can also facilitate any inventory replenishment activities as well. The inventory server 108 can be a logically separate entity from the server 104 and the databases 110A, 110B, but physically the inventory server 108 can coexist on the same hardware as the server 104. As the inventory server 108 can service other disparate systems, the server 108 can provide additional computational resources to avoid overutilization of the inventory server 108. The server 108 provides the computational resources to decode data from the array of sensor modules 102, as well as interfacing with the point-of-sale terminal 106. To minimize computational burden on the inventory server 108, the server 104 only interfaces with the inventory server when information inventory or product information is necessary for the process.

The databases 110A, 110B can include rows or records corresponding to items in a facility, items of interest being viewed and/or selected by users, items being monitored by the array of sensor modules 102. The inventory server 108 provides an interface for accessing the databases 110A, 110B. As the inventory databases 110A, 110B can be accessed by other disparate systems, the inventory server 108 can provide support for all query requests for the database. The inventory server 108 can queue query requests to mitigate database 110A, 110B query overloads. At least some of the records can be generated on a set interval to display trends relating to the items being analyzed by the array of sensor modules 102. The databases 110A, 110B can include records corresponding to past item purchase history and trends. Additionally the databases 110A, 110B can include latent attributes corresponding to each item in the databases 110A, 110B where each latent attribute corresponds to a characteristic of the product. Like the inventory server 108, the databases 110A, 110B can be logical instances of databases, and can physically reside on the server 104.

Figure 2:
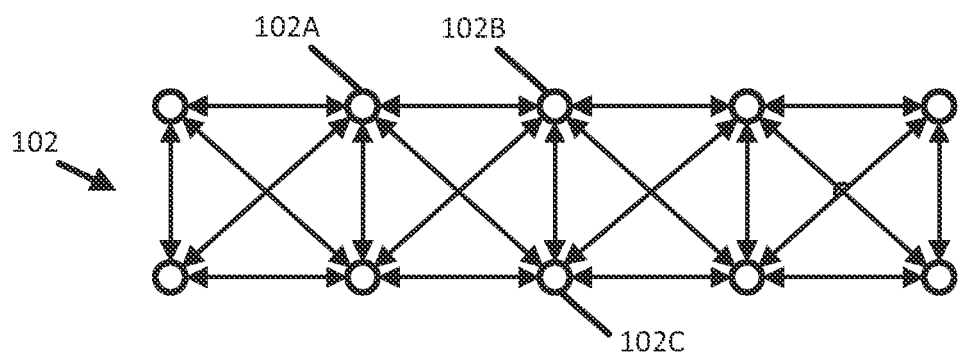
FIG. 2 is diagram illustrating a deployment of an array of sensor modules in the distributed sensor system according to an exemplary embodiment.

FIG. 2 is diagram illustrating the deployment of an embodiment of the array of sensors 102 in a retail environment according to an exemplary embodiment. In the present example embodiments, the sensor modules in the array of sensor modules 102 can wirelessly communicate with adjacent/neighboring sensor modules. As mentioned above the array of sensor modules 102 can utilize one or more wireless communication stacks or protocols.

Each of the sensor modules in the array 102 can have three modes of operation based on object detection by the sensor in each sensor module and/or based on the object detection by the sensors in one or more adjacent or neighboring sensor modules. As one example each sensor module can have sleep state (e.g., a first mode of operation), an active state (e.g., a second mode of operation), and an intermediate state (e.g., a third mode of operation). In exemplary embodiments, each of the sensor modules can normally be in the sleep state of operation (i.e. the default state)

In an exemplary operation, when the sensor of a first sensor module 102A detects an object (e.g., a user standing in front of and within range of the sensor), the first sensor module 102A transitions from the sleep state to the active mode. The first sensor module 102A determines the existence and/or movement of a user based on sensed data output by the sensor. In another embodiment, the first sensor module 102A, transmits the data to the server 104, which determines the existence and/or movement of the user.

In response to the first sensor module detecting the user, the first sensor module transmits a wake message to its adjacent/neighboring sensor modules, which can include a second sensor module 102B as well as other sensor modules. Additionally, or in the alternative, as described herein, the first sensor module can transmit a message to the server 104 (FIG. 1) if the sensor module continuously detects the user for a specified time threshold. In response to the second sensor module 102B receiving the wake message from first sensor module 102A, the second sensor module 102B, transitions from the sleep state to the intermediate state. While the second sensor module 102B is in the intermediate state, the second sensor module 102B recordation of sensing data is enabled in the second sensor module and the wireless transmitter is disabled.

In one example operation, the first the sensor module 102A also transmits sensing data to the server upon continuous detection of the first user within range of the first one of the sensor modules for a period of time that is greater than the threshold time or reverts back to the sleep state upon detection of the user within range of the first one of the sensor modules for a period of time that is less than the threshold time.

Upon detection of the second user by the second sensor module 102B, the second sensor module 102B, transitions from the intermediate state to the active state. The second sensor module transmits a wake message to its adjacent/neighboring sensor modules. Additionally, or in the alternative, as described herein, the first sensor module can transmit a message to the server 104 (FIG. 1) if the sensor module continuously detects the user for a specified time threshold.

As the user moves out of range of the sensor modules in that are in the active state and a specified amount of time has passed, the sensor modules return to the sleep state unless the sensor modules receive a wake message from a neighboring sensor module in which case the sensor module(s) enter the intermediate state.

Figure 3:
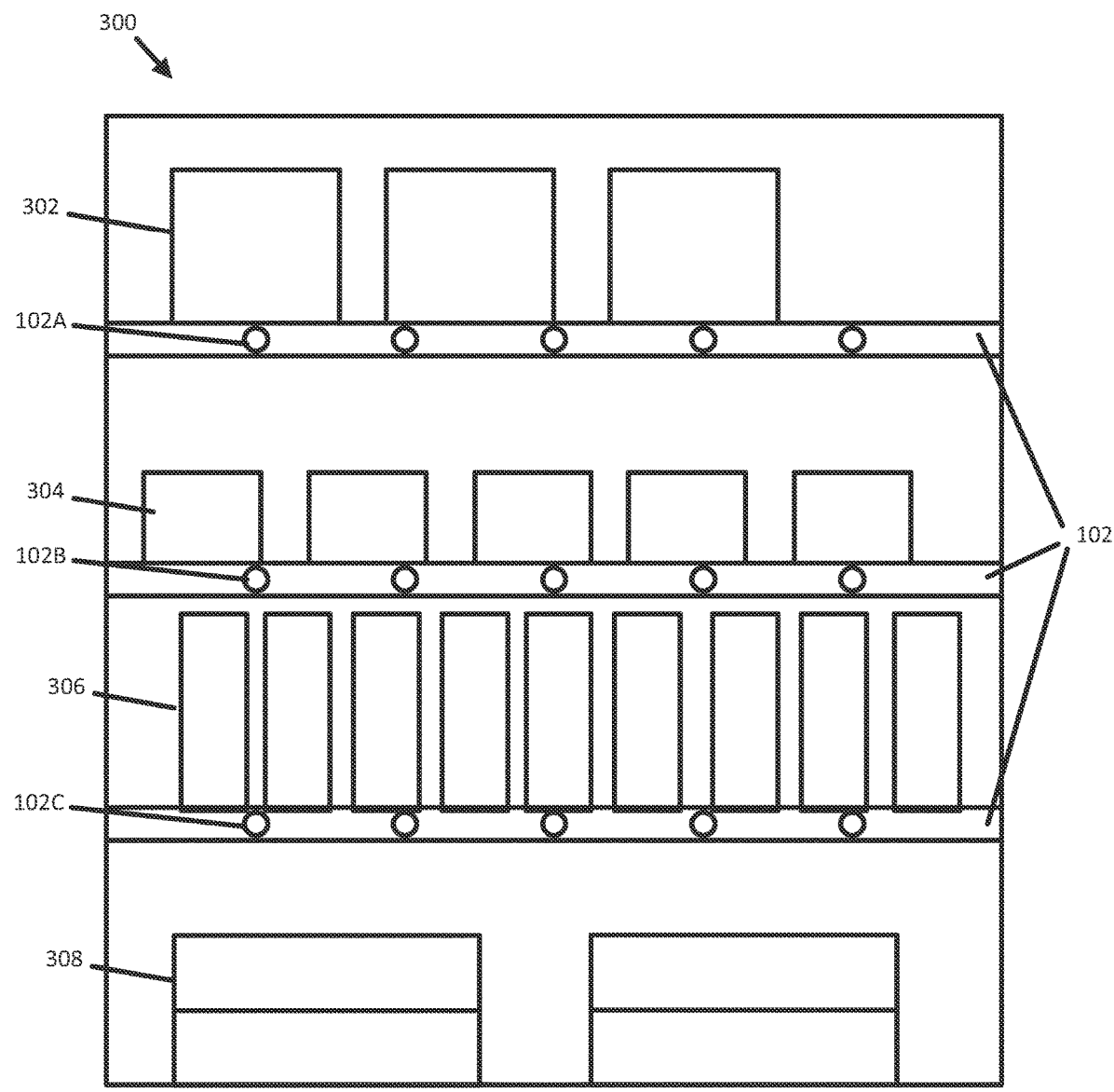
FIG. 3 is a diagram illustrating a deployment of an array of sensor modules in a shelving unit according to an exemplary embodiment.

FIG. 3 is a diagram illustrating the deployment of an array of sensor modules in a shelving unit according to an exemplary embodiment.

The deployment of an array of sensor modules 102 can include affixing of each of the array of sensor modules 102 to a shelving unit 300. The array of sensor modules 102 can be deployed on the shelves of the shelving unit 300. Alternatively, the array of sensor modules 102 can be deployed at the top of the shelving unit 300 or the base of the shelving unit 300. The array of sensor modules 102 can be placed correspondingly to different products located on the shelves of the shelving unit 300, where one of the sensor modules in the array of sensor modules 102 corresponds to a specific item stock. Each of the sensors in the array of sensor modules 102 can be spaced by the average dimension of items in a category corresponding to the items.

In this embodiment the first sensor module 102A can be placed correspondingly to a specific item A 302. The first sensor module 102A can detect and transmit any data corresponding to interactions with item A.

The second sensor module 102B can be placed corresponding to a specific item B 304. The second sensor module 102B can detect and transmit any data corresponding to interactions with item B.

The third sensor module 102C can be placed corresponding to a specific item C 306. The second sensor module 102C can detect and transmit any data corresponding to interactions with item C.

In this embodiment, as the user views item A 302, moves to item B 304, and finally to item C 306, each of the sensors in the arrays of sensors 102 changes power states corresponding to the item being observed. In this embodiment, historical data about the item being viewed can be determined by the changing of power states of the modules.

Figure 4:
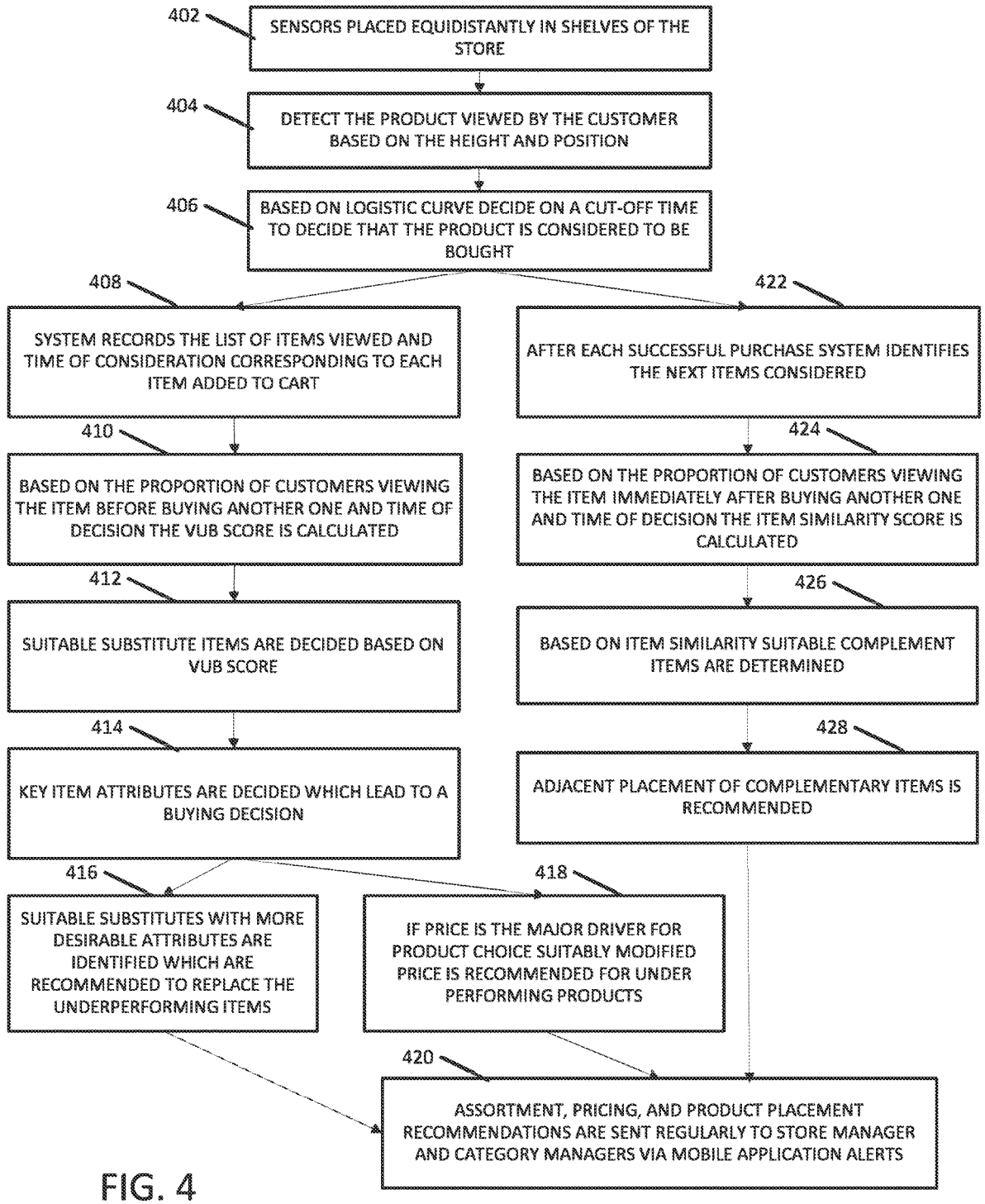
FIG. 4 is a flowchart illustrating a process implemented by the distributed sensor system for determining continuous detection of a user according to an exemplary embodiment.

FIG. 4 is a flowchart illustrating a process determining continuous detection of a user according to an exemplary embodiment.

At step 402, sensor modules can be placed equidistantly in shelves of the store. The sensors can be an array of sensors. The sensors can be implemented as optical sensors, acoustic sensors, weight sensors, RFID tags/readers, inductive sensors, capacitive sensors, cameras or a combination of these. The sensors detect and record the amount of time spent by the user in front of the item. The adjacent sensors communicated through Bluetooth, or comparable wireless protocol, to detect and track movement of users from one item to another and to detect double-counting.

At step 404, a product viewed by the user is detected by one or more of the sensor modules based on the height and position. A time spent by a user i in front of an item j can be denoted $T_{ij}$. Let $Y_{ij}$ denote an indicator variable such that: $Y_{ij}=1$, if the user i and purchases the item j. Otherwise $Y_{ij}=0$. Then for the $j^{th}$ item, a logistic regression is performed as follows:

$$P_{ij} = \text{Probability } (Y_{ij} = 1)$$

$$\log(P_{ij}/(1-P_{ij})) = \alpha + \beta * T_{ij} + e_{ij}$$

$$P_{ij} = 1(1 + \exp(-(\alpha + \beta * T_{ij}))) + e_{ij} - 1$$

$$\text{where } e_{ij} \sim N\left(0, \sum\right)$$

Fitting a least squares solution by minimizing the sum of squares $e_{ij}$, estimated values of the unknown values $\alpha$ and $\beta$ can be obtained. Utilizing the estimated values of $\alpha$ and $\beta$, a predicted value for $P_{ij\,can}$ be obtained from the observed $T_{ij}$ values.

At step 406, based on logistic curve, a cut-off time can be determined by the sensor module that detected the user or by the server (in response to the sensor module transmitting sensed data to the server) to facilitate a decision indicating that the product is considered to be bought. Starting with an arbitrary cut-off value $c_0$, if predicted $P_{ij} > c_0$, then the predicted indicator variable equals one, $Y_{ij}=1$. A sensitivity can be defined as a proportion of times that actual $Y_{ij}=1$. Specificity can then be defined as a proportion of times that actual $Y_{ij}=0$. A plot of specificity and its inverse, e.g., 1-specificity, forms a receiver operation characteristic (ROC) curve.

The area under the curve (AUC) corresponding to all possible values of $c_0$, ($0<c_0<1$) can be computed and the optimal value of $c_0=c_1$ which is the AUC maximum can be selected. Substituting Pij with $c_1$ and using the estimated values of $\alpha$ and $\beta$, the optimal cut-off for $T_{ij}$ can be obtained. The optimal cut-off values are obtained for each item in a category of items available (e.g., on the shelves and/or in a facility) and updated periodically, e.g., at a daily, weekly, monthly, or yearly intervals. When the time spent in front of an item is greater than the optimal value ($T_{ij}>c_1$) for a given user/item combination is observed, the system can determine that the user is interested in that item.

At step 408, the server records the list of items viewed and time of consideration corresponding to each item added to the cart. The server can store the viewed and time of consideration for each item in the databases 110A, 110B.

The databases 110A, 110B can create a row corresponding to the item, where a new row represents a new observed time of consideration corresponding to each item added to the cart.

At step 410, based on the proportion of users viewing the item before buying another one, and time of decision, the sensor module or the server can calculate the viewed and ultimately bought (VUB) score for the item. Based on the past point of sale (POS) sales records and user data recorded by the server, the following can be calculated:

$P_{b|a}$=(number of users who are interested in item b)/(number of users who purchase item a)

$T_{b|a}$=(average time spent by the users who purchase item a, to consider item b)/(average time spent by the users to consider item b)

The VUB score of item b relative to item a is V(b|a) =$P_{b|a}*T_{b|a}$. Best substitutes of item a are given by those with maximum values of V(b|a).

At step 412, the server identifies suitable substituted items based on VUB scores. Best substitutes of item a are given by those with maximum values of V(b|a). The list of items considered by a user i immediately after putting item a in the cart can be taken into account. The also bought score (ABS) of item b relative to item a can be determined by dividing the number of users who add item b to the cart after adding item a by the number of users adding item a to the cart (ABS (b|a)=(number of users who add item b to the cart after adding item a)/(number of users adding item a to the cart)).

The Also Viewed Score (AVS) of an item b relative to item a can be determined dividing the number of users who are interested in item b after adding item a to cart and before the next addition to cart by the number of users adding item a to cart (AVS(b|a)=(number of users who are interested in item b after adding item a to cart and before the next addition to cart)/(number of users adding item a to cart)).

The base item similarity (BIS) score=BIS(b|a)=a1*ABS (b|a)+AVS(b|a). a1 denotes a characteristic based on a proportion of items viewed over items purchased, where a1= (average number of items viewed by users after purchasing item A)/(Average number of items purchased by users after purchasing item a). The item similarity score is TIS(b|a)= (average time spent by users in viewing item b after purchasing item a)/(average time spent by users in viewing all items after purchasing item a before the next purchase). The item similarity score I of item b relative to item a is I(b|a)=BIS(b|a)*TIS(b|a). Best complements of item a are given by those with maximum values of I(b|a).

At step 414, key item attributes are decided by the server based on the VUB scores. Using the VUB scores, the list of best substitutes for each item can be obtained. Latent item attributes like price, weight, pack size, color, flavor, nutrition index can be utilized as attributes depending on the category of items. Utilizing a model V(b|a)~l1, l2, ... where l1 and l2 are latent attributes, the variable importance score of the Random Forest model, can determine the most important distinguishable attributes L1, L2, L3, etc. A classification model based upon the any sensed data for each item can be used to determine key driver attributes.

At step 416, suitable substitutes with more desirable attributes are identified by the server and are recommended to replace the underperforming items. A list of substitutes can be identified and ordered based on past sales. Comparing important attributes L1, L2, ... etc. between the highest and lowest selling items can give the causal levels of the important attributes which can cause the variation in item performance. For example, item B1 can be the highest selling good with higher levels of attributes L11, L21, etc. and item B5 can be the lowest selling good with higher attribute levels L15, L25, etc. Low performing items can be substituted by those items which have high VUB scores and the causal levels of important attributes which cause high performances. In the above example item B5 can be substituted with another item, B7, with high attribute levels L11, L21, L35, and L45.

At step 418, if price is the major driver for product choice, suitably modified prices are recommended for underperforming products. If L1=price and the remaining attributes are less important, then decreasing the price of the low performing item can lead to better sales of the item. Items with high similarity scores should be placed adjacently to increase the cross-sales.

At step 420, assortment, pricing and product placement recommendations are generated by the server and sent regularly to store manager and category managers via mobile application alerts.

In parallel to the process described above, at step 422, the server identifies the next items considered after each successful purchase. The server utilizes the next considered items in a feedback loop upon the purchase of an item.

At step 424, based on the proportion of users viewing the item immediately after buying another one, and a time of decision, the item similarity score is calculated by the server. The similarity score is dependent upon the time frame in which the user removes the item from the shelf, places it in the cart, and views another item.

At step 426, based on item similarity, suitable complement items are determined by the server. The items viewed immediately after the removed item, can be used to determine the latent attributes in the suitability scores.

At step 428, adjacent placement of complementary items is recommended by the server.

Figure 5:
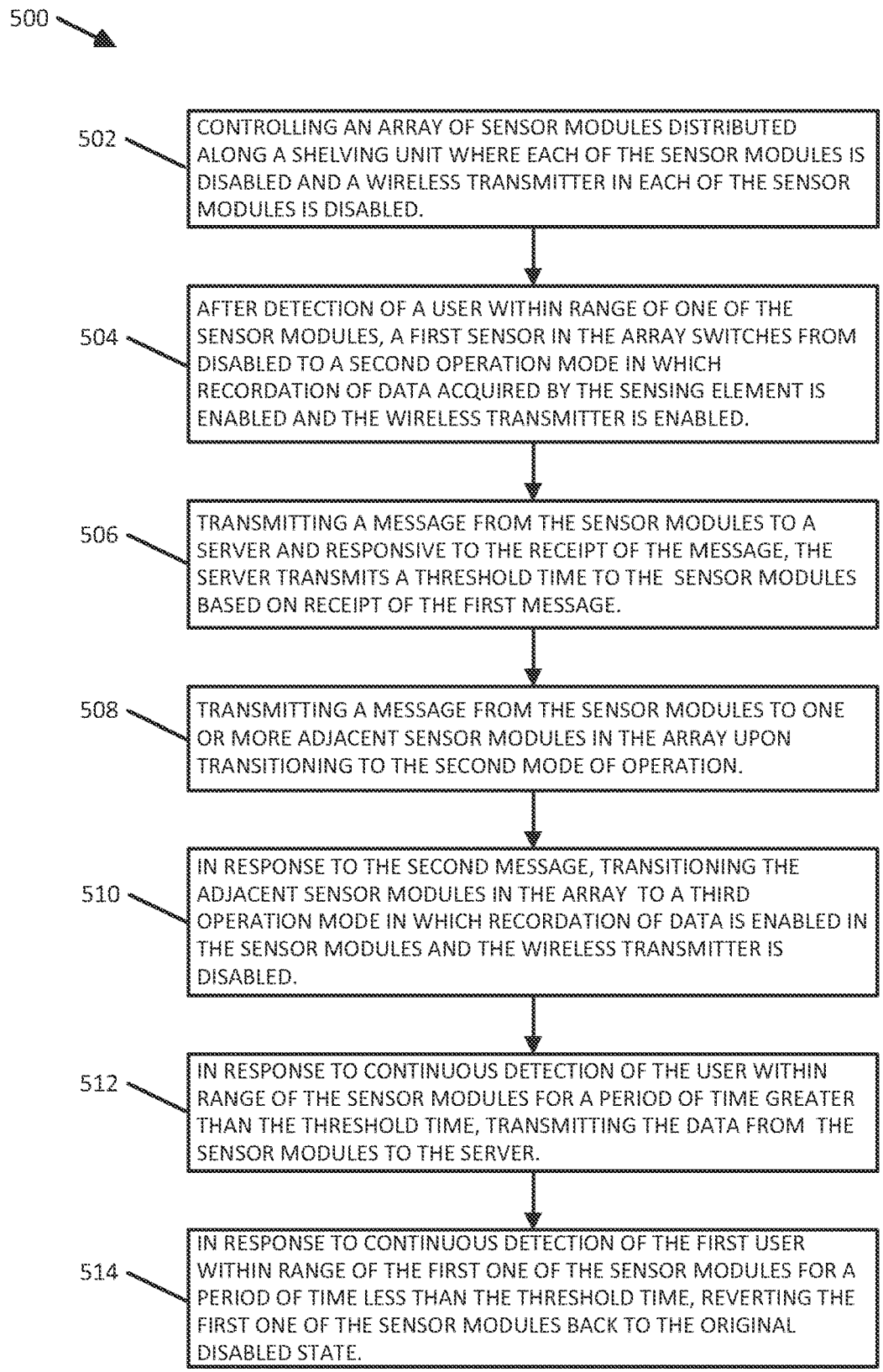
FIG. 5 is a flowchart illustrating a process implemented the distributed sensor system for modifying inventory records based on sensor outputs according to an exemplary embodiment.

FIG. 5 is a flowchart illustrating a process determining continuous detection of a user according to an exemplary embodiment.

At step 502, an array of sensor modules distributed along a shelving unit in a facility are controlled according to a first operation mode by default in which recordation of sensor data acquired by a sensing element in each of the sensor modules is disabled and a wireless transmitter in each of the sensor modules is disabled. The array of sensor modules, when inactive, exist in a low power state or sleep state.

At step 504, in response to detection of a user within range of a first one of the sensor modules, the first one of the sensor modules in the array transitions from the first operation mode to a second operation mode in which recordation of the sensing data acquired by the sensing element is enabled and the wireless transmitter is enabled. The first sensor modules activates the corresponding sensing element and begins recording data from the sensing element. Additionally, the first user is identified, from the sensing data, removing at least one or more of the items from the shelving unit. A preference score is calculated for each item using the sensing data and whether the user removes the item from the shelving unit.

Additionally, a message request can be transmitted from sensor modules to the server. The server transmits a threshold time to the sensors on receipt of the message request. Another message can be transmitted from the sensor modules to the first one of the sensor modules upon transitioning to the second mode of operation. In response to receipt of the message, the first one of the sensor modules transitions to the third operation mode in which recordation of sensing data is enabled and the wireless transmitter is disabled.

At step 506, a first message is transmitted from the first one of the sensor modules to a server in selective communication with the sensor modules, the server configured to receive the first message from the first one of the sensor modules and to transmit a threshold time to the first one of the sensor modules based on receipt of the first message. The threshold time corresponds to a time long enough in duration to determine that a user is interested in a product located adjacent or near the first one of the sensor modules. The threshold time associated with each item can also be extracted from the sensing data. Based on the preference score, a recommendation is provided to a second user for at least one of the items. The recommendation can include replacing a low-performing item with a different item, rearranging locations of item on the shelving unit or changing the pricing for an item.

At step 508, upon transitioning to the second mode of operation, a second message can be transmitted from the first one of the sensor modules to one or more of the sensor modules in the array that are located adjacent to the first one of the sensor modules. The first one of the sensor modules notifies the adjacent sensor modules of an impending change of state.

At step 510, in response to receipt of the second message, the one or more sensor modules in the array located adjacent to the first one of sensor modules transition to a third operation mode in which recordation of sensing data is enabled in the one or more sensor modules and the wireless transmitter is disabled. The first sensor module notifies the adjacent modules to begin to record sensing data, At step 512, in response to continuous detection of the first user within range of the first one of the sensor modules for a period of time greater than the threshold time, the sensing data is transmitted from the first one of the sensor modules to the server. Upon the user lingering for the threshold time, the first sensor propagates its recorded data to the server 104.

At step 514, in response to continuous detection of the first user within range of the first one of the sensor modules for a period of time less than the threshold time, the first one of the sensor modules reverts back to the first operation mode. As the user can be transiting in front of the one or more sensor modules, the failure to meet the threshold allows the first one of the sensor modules to revert to a low power, sleep or disabled state.

Figure 6:
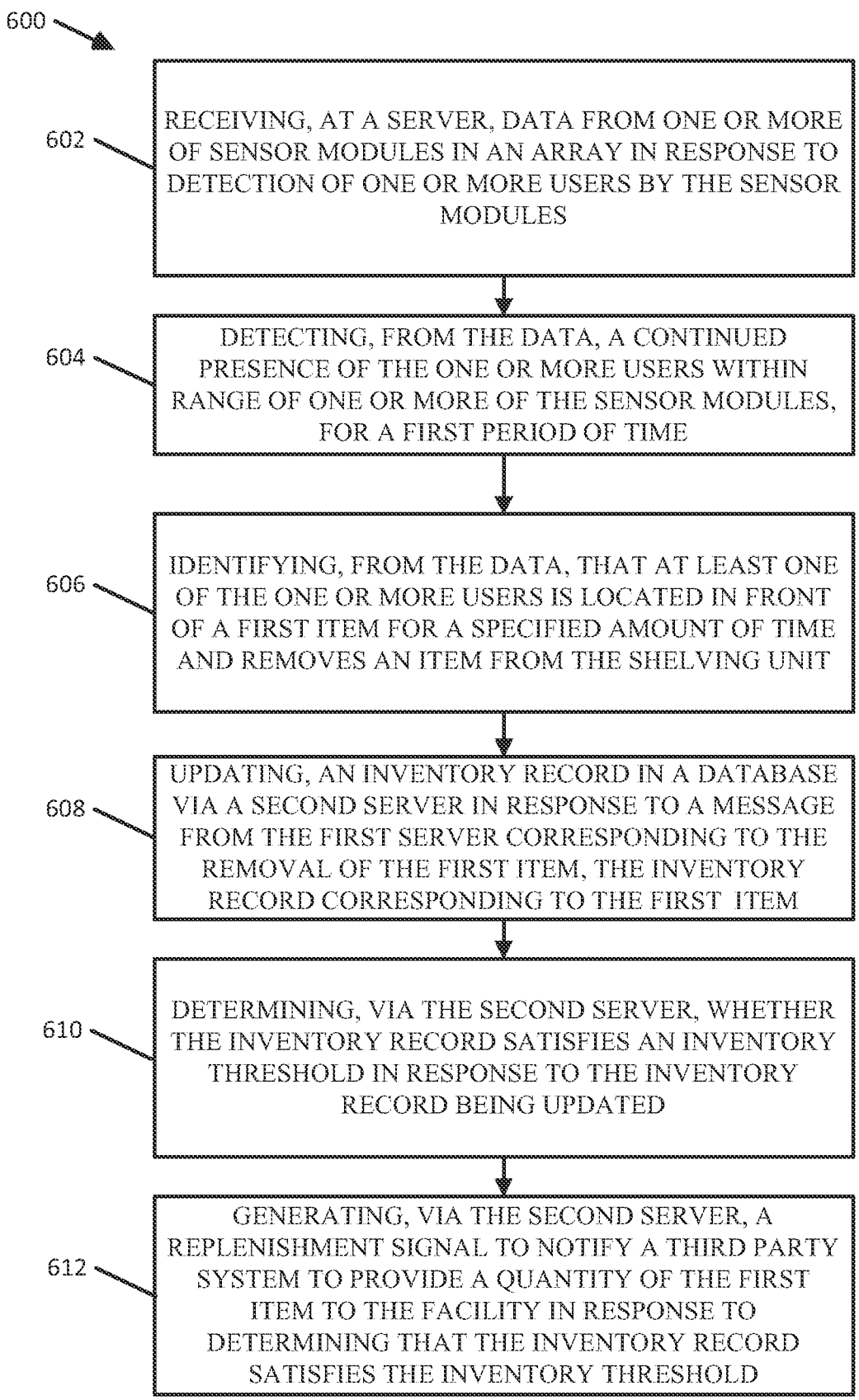
FIG. 6 is a flowchart illustrating a process for updating inventory records according to an exemplary embodiment.

FIG. 6 is a flowchart illustrating a process for updating inventory records according to an exemplary embodiment.

At step 602, sensing data can be received at a first server from one or more of sensor modules in an array in response to detection of one or more users by the one or more of the sensor modules. The sensing data can be transmitted over a wired or wireless connection or through standard networking infrastructure. Alternatively, the sensing data can be received at the server through mesh IoT networking infrastructure, including a Bluetooth low energy (LE) mesh network.

At step 604, a continued presence of the one or more users within range of one or more of the sensor modules, for a first period of time, can be detected from the sensing data. The server determines from the sensing data that one or more users are present in the vicinity of the sensor and related items. The sensing data can be optical in nature (e.g., an image), acoustic, or can take the form of weight values take from scales on which users transit.

At step 606, the first one of the sensor module can identify, from the sensing data, that at least one of the one or more users is located in front of a first item for a specified amount of time and removes the first item from the shelving unit. Similar to as described above, the sensing data can persist for a period greater than the specified amount of time, and the sensing elements can detect a change relative to their sensing methods (e.g., change in weight on a scale corresponding to an item being added to a cart).

At step 608, an inventory record in a database can be updated via a second server in response to a message from the first server corresponding to the removal of the first item, the inventory record corresponding to the first item. The second server can take the form of an inventory server. The inventory server facilitates the procurement of additional product stock. The inventory server monitors the stock of the items in store, as well as stock in the distribution centers, and peer retail stores. Additionally the inventory server can procure stock from the vendor of the items. The inventory server can determine a probability that the first item is viewed and ultimately removed from the facility. The inventory server can update the record corresponding to the item when the probability is determined to be greater than a threshold. Alternatively, the server can monitor the POS terminals to identify transactions corresponding to the item after the removal from the shelving unit. The server can determine whether the time between the users interest, and the removal satisfies a threshold, and then determine the shortest period of time between the continuous detection of the user within range of the sensor and the point of sale transaction.

At step 610, the second server can determine whether the inventory record satisfies an inventory threshold in response to the inventory record being updated. Once the inventory record is depleted of sufficient amount to sustain adequate stock, the inventory server can take action to remedy the stock.

At step 612, the second server can generate a replenishment signal to notify a third party system to provide a quantity of the first item to the facility in response to determining that the inventory record satisfies the inventory threshold. The inventory server can notify a peer store, distribution center or vendor to prepare an order of the item. The inventory threshold can be determined based in part on the capacity for transport of the items or a transport time.

Figure 7:
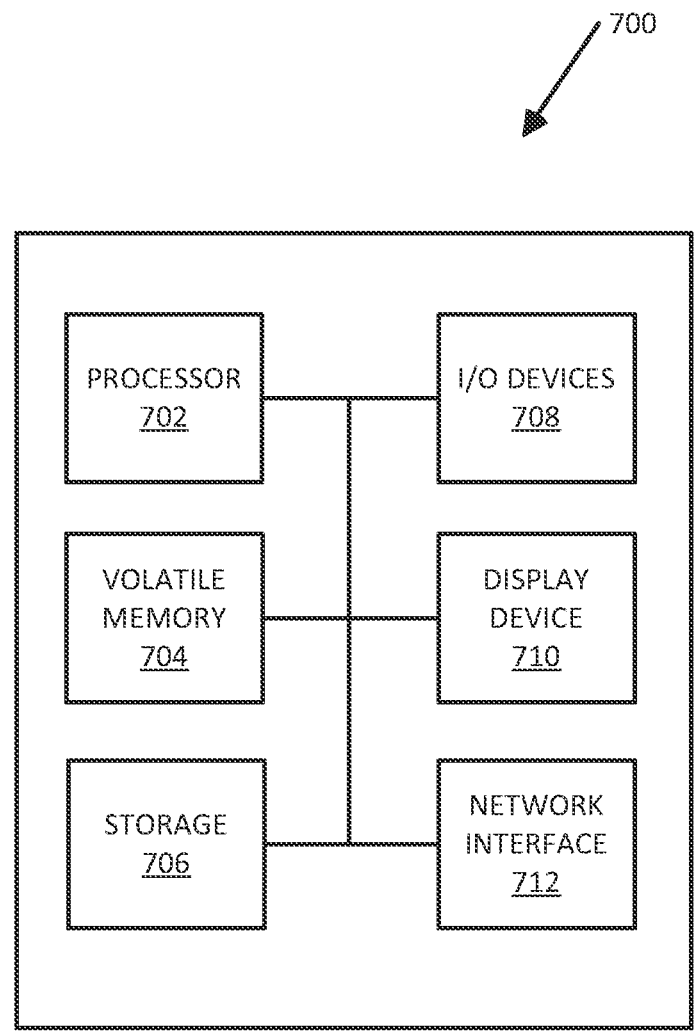
FIG. 7 is a block diagram illustrating an electronic device operable to support the distributed sensor system according to an exemplary embodiment.

FIG. 7 is a block diagram illustrating an electronic device operable to support a system for inventory management according to an exemplary embodiment.

Computing device 700 process product scoring and inventory management. The computing device 700 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives, one or more solid state disks), and the like. For example, volatile memory 704 included in the computing device 700 can store computer-readable and computer-executable instructions or software for implementing exemplary operations of the computing device 700. The computing device 700 also includes configurable and/or programmable processor 702 for executing computer-readable and computer-executable instructions or software stored in the volatile memory 704 and other programs for implementing exemplary embodiments of the present disclosure. Processor 702 can be a single core processor or a multiple core processor. Processor 702 can be configured to execute one or more of the instructions described in connection with computing device 700.

Volatile memory 704 can include a computer system memory or random access memory, such as DRAM, SRAM, EDO RAM, and the like. Volatile memory 704 can include other types of memory as well, or combinations thereof.

A user can interact with the computing device 700 through a display 710, such as a computer monitor, which can display one or more graphical user interfaces supplemented by I/O devices 708, which can include a multi-touch interface, a pointing device, an image capturing device and a reader.

The computing device 700 can also include storage 706, such as a hard-drive, CD-ROM, or other computer-readable media, for storing data and computer-readable instructions and/or software that implement exemplary embodiments of the present disclosure (e.g., applications). For example, storage 706 can include one or more storage mechanisms for storing information associated with viewed and ultimately bought scores and latent attributes and can be indexed accordingly. The storage mechanism can be updated manually or automatically at any suitable time to add, delete, and/or update one or more data items in the databases 110A, 110B.

The computing device 700 can include a network interface 712 configured to interface via one or more network devices with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the network interface 712 can include one or more antennas to facilitate wireless communication between the computing device 700 and a network and/or between the computing device 700 and other computing devices. The network interface 712 can include a built-in network adapter, network interface card, PCMCIA network card, card bus network adapter, wireless network adapter, USB network adapter, modem or any other device suitable for interfacing the computing device 700 to any type of network capable of communication and performing the operations described herein.

Figure 8:
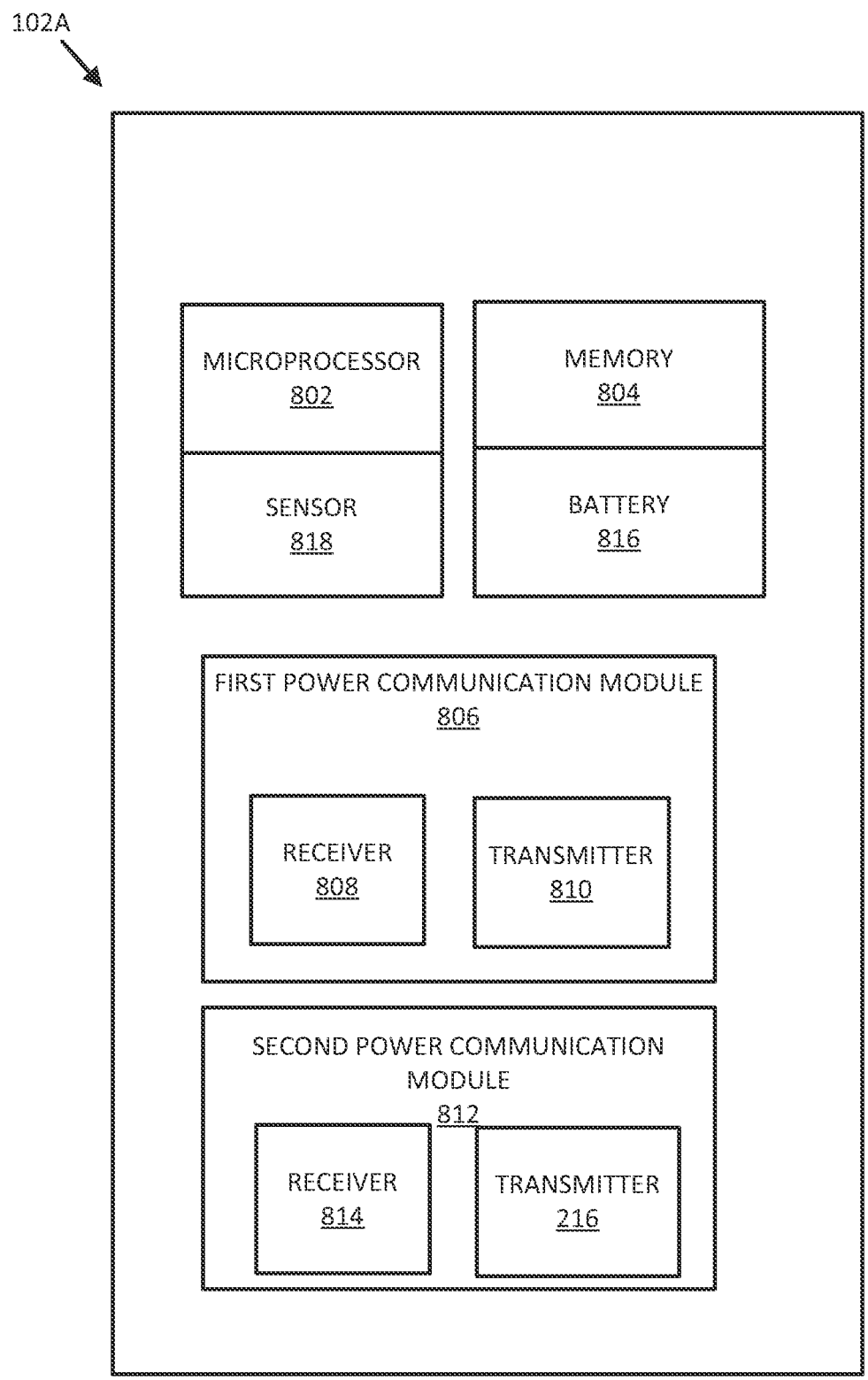
FIG. 8 is a block diagram of an example sensor module to support the distributed sensor system according to an exemplary embodiment.

FIG. 8 is a block diagram of an example embodiment of the sensor module 102A to support the distributed sensor system according to an exemplary embodiment. Each sensor module in the array of sensor modules described herein can be implemented according to the example embodiment of the sensor module 102A. The sensor module 102A includes a microprocessor 802 communicatively coupled to a memory 804, a battery 816 to provide power to the sensor module 102A, a first power level (FPL) radiofrequency communication module 806, and a second power level (SPL) radiofrequency communication module 812. The FPL radiofrequency communication module 806 and the SPL radiofrequency communication module 812 are configured to transmit and receive data at different power levels to control a range of communication with the server 104 and other sensor module 102A, as described herein.

The FPL radiofrequency communication module 806 includes a receiver 808 configured to receive signals at a first power level via wireless communication transmitted from the server 104 via one or more wireless access points and convert the signals to electrical signals that can be read by the microprocessor 802. The FPL radiofrequency communication module 806 further includes a transmitter 810 configured to transmit signals at a first power level via wireless communication through one or more wireless access points to the server 104. In the example embodiment, the wireless communication between an electronic shelf label and the wireless access point(s) uses a Wi-Fi communication protocol with the first power level. In some embodiments, the receiver 808 and transmitter 810 are combined into a transceiver unit.

The SPL radiofrequency communication module 812 includes a receiver 814 configured to receive signals at a second power level via wireless communication transmitted from one or more of the sensor modules 102. The receiver 814 can convert the signals to electrical signals that can be read by the microprocessor 802. The SPL radiofrequency communication module 812 further includes a transmitter 816 configured to transmit signals at a second power level via wireless communication. The SPL radiofrequency communication module 812 is configured to transmit data at the second power level using at least one of low level Wi-Fi, Bluetooth, low energy Bluetooth, near field communication (NFC), or RFID capabilities. In an exemplary embodiment, the transmitter 816 can be configured to transmit signals at the second power level through RFID connections to one or more sensor modules 102A. In some embodiments, the receiver 814 and transmitter 816 are combined into a transceiver unit.

While the non-limiting example embodiment shown in FIG. 8 includes the first power level radiofrequency communication module 806 and the second power level communication module 812, exemplary embodiments of the electronic shelf labels can include a single communication module that is configured to selectively transmit data/information at the first power level and to selectively transmit data/information at the second power level. For example, in exemplary embodiments, a communication module of a sensor module 102A can be configured to selectively transmit data/information to the wireless access point(s) at the first power level and to selectively transmit data/information to other electronic shelf labels at the second power level. In some embodiments, the frequency at which the data/information is transmitted is identical for transmissions at the first and second power levels. In some embodiments, the frequency at which the data/information is transmitted is different for transmissions at the first and second power levels.

The sensor module 102A can further include at least one sensor 818 controlled by the microprocessor 802. For example, the sensor 818 may include optical sensors, acoustic sensors, weight sensors, radio-frequency identification (RFID), inductance sensors, capacitive sensors, cameras (e.g., CMOS imagers or CCD sensors). In one embodiment, the sensor module 102A includes a sensor driver, and the microprocessor 802 is arranged to control updates of the sensor 818 by controlling the sensor driver.

The microprocessor 802 of the sensor module 102A is configured to receive programming instruction from the server 104 or another one of the sensor modules to configure the sensor module 102A to detect activity in front of the sensor 818, such as a customer viewing a product on the shelf associated with the sensor module 102A. More particularly, the microprocessor 802 is configured to process the received programming instructions and relate the instructions to the operation of the sensor 818.

The sensor module 102A can operate in a sleep mode of operation, an intermediate mode of operation, and an active mode of operation. In the sleep mode of operation, the microprocessor 802 and communication module 806 are in a low power state (e.g., drawing micro-Amps), while the sensor 818 is operation to detect objects and the SPL communication module 812 is functional to receive messages from other sensor modules, but not to transmit messages. In the intermediate mode of operation, the microprocessor 802 and communication module 806 are in a low power state (e.g., drawing micro-Amps), while the sensor 818 is operating to detect objects and the communication module 812 is functional to transmit and receive messages. In the active mode of operation, each component of the sensor module 102A is fully operational/functional to perform the functions described herein with respect to the active mode.

The microprocessor 802 can operate in the sleep mode for an indefinite period of time, and can periodically transition to operate in an awake/active mode (activate from the sleep mode) to identify whether one of the sensor modules 102A has detected a consumer within sensing area. Alternatively, or in addition, an output of the sensor can be connected to the microprocessor, and a change in the output of the sensor can cause the microprocessor to transition to the active mode. The microprocessor can transition from the sleep mode of operation to the intermediate mode of operation in response to an adjacent/neighboring sensor module detecting an object/user and transmitting a message to the sensor module, which can be received via the SPL communication module 812, which can receive the message and output it to the microprocessor.

When the sensor module 102A is in the sleep mode operation, and the sensor 818 detects an object/user, the microprocessor transitions from the sleep mode to the active mode. In response to transitioning to the active mode, the microprocessor can control the SPL communication module 812 to transmit a message at the second power level to other adjacent or neighboring sensor modules (e.g., as defined by those sensor modules within range of the transmission from the communication module 812 at the second power level or those sensor modules having specified addresses/identifiers) . The neighboring/adjacent sensor modules can receive the message and transition from the sleep mode to the intermediate mode. When in an active mode, the microprocessor 802 controls the communication channels, for example, by controlling when to send transmissions to other sensor modules 102A and receive data from the server 104 including data for other sensor modules. In this way, sufficient processor capacity is available when needed, for example, for information updates. At the same time, since the microprocessor 802 is only active and consuming power when it is needed (e.g., to discharge the duties of an actively detecting sensor), excess or unnecessary power consumption is minimized. After a predefined period of time or after the sensor module no longer detects a consumer, the microprocessor 802 returns to sleep mode and power consumption will be reduced.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components, or steps can be replaced with a single element, component, or step. Likewise, a single element, component, or step can be replaced with multiple elements, components, or steps that serve the same purpose. Moreover, while exemplary embodiments have been shown and described with references to particular embodiments thereof, those of ordinary skill in the art will understand that various substitutions and alterations in form and detail can be made therein without departing from the scope of the present disclosure. Further, still, other aspects, functions, and advantages are also within the scope of the present disclosure.

Exemplary flowcharts are provided herein for illustrative purposes and are non-limiting examples of methods. One of ordinary skill in the art will recognize that exemplary methods can include more or fewer steps than those illustrated in the exemplary flowcharts and that the steps in the exemplary flowcharts can be performed in a different order than the order shown in the illustrative flowcharts.

I claim:

1. A distributed sensor inventory management system comprising:
    an array of sensor modules distributed along a shelving unit in a facility, each of the sensor modules in the array being associated with items on the shelving unit, wherein each of the sensor modules in the array comprises an image detector that is configured to detect an amount of time spent by one or more users in front of an item on the shelving unit;
    a first server in selective communication with the sensor modules, the first server configured to:
    receive optical sensing data from one or more of the sensor modules in the array in response to detection of one or more users by the one or more of the sensor modules;
    detect, from the optical sensing data, a continued presence of the one or more users within range of the one or more of the sensor modules for a first period of time;
    identify, from the optical sensing data, that at least one of the one or more users is located in front of a first item for an amount of time and removes the first item from the shelving unit; and
    a second server in selective communication with the first server, the second server being configured to:
    receive a message from the first server in response to the removal of the first item;
    determine a probability that the first item is viewed and ultimately removed from the facility without monitoring transactions at a plurality of point-of-sale terminals by comparing the amount of time that the at least one of the one or more users is located in front of a first item to a threshold time value determined based on a logistic curve;
    update an inventory record in a database in response to comparing the probability to a probability threshold and determining the probability is greater than the probability threshold, the inventory record corresponding to the first item;
    determine, responsive to the updating of the inventory record, whether the inventory record satisfies an inventory threshold; and
    generate a replenishment signal, responsive to the determining, to notify a third party system to provide a quantity of the first item to the facility.

2. The system of claim 1, wherein the third party system is associated with a peer retailer, a distribution center, or a vendor.

3. The system of claim 1, wherein the each of the sensor modules includes a near-field communications transmitter for intercommunication between neighboring ones of the sensor modules in the array.

4. The system of claim 1, wherein a spacing between the sensor modules on the shelving unit is determined by an average dimension of items in a category corresponding to the items.

5. The system of claim 1, wherein the inventory threshold is based at least in part on a capacity for transport and a transport time.

6. An inventory management method in a distributed sensor system comprising:
    receiving, at a first server, optical sensing data from one or more sensor modules in an array distributed along a shelving unit in a facility in response to detection of one or more users by the one or more of the sensor modules, wherein each of the sensor modules in the array is associated with items on the shelving unit and each of the sensor modules in the array comprises an image detector that is configured to detect an amount of time spent by one or more users in front of an item on the shelving unit;
    detecting, from the optical sensing data, a continued presence of the one or more users within range of one or more of the sensor modules, for a first period of time;
    identifying, from the optical sensing data, that at least one of the one or more users is located in front of a first item for an amount of time and removes the first item from the shelving unit;
    determining a probability that the first item is viewed and ultimately removed from the facility without monitoring transactions at a plurality of point-of-sale terminals by comparing the amount of time that the at least one of the one or more users is located in front of a first item to a threshold time value determined based on a logistic curve;
    updating, an inventory record in a database via a second server in response to comparing the probability to a probability threshold and determining the probability is greater than the probability threshold, the inventory record corresponding to the first item;
    determining, via the second server, whether the inventory record satisfies an inventory threshold in response to the inventory record being updated; and
    generating, via the second server, a replenishment signal to notify a third party system to provide a quantity of the first item to the facility in response to determining that the inventory record satisfies the inventory threshold.

7. The method of claim 6, wherein the third party system is associated with a peer retailer, a distribution center, or a vendor.

8. The method of claim 6, wherein each of the sensor modules includes a near-field communications transmitter for intercommunication between neighboring ones of the sensors modules in the array.

9. The method of claim 6, wherein a spacing between the sensor modules on the shelving unit is determined by an average dimension of items in a category corresponding to the items.

10. The method of claim 6, wherein the inventory threshold is based at least in part on a capacity for transport and a transport time.

11. A non-transitory computer readable medium, having stored thereon, instructions that when executed in a computing system, cause the computing system to perform operations comprising:
    receive optical sensing data from one or more sensor modules in an array distributed along a shelving unit in a facility in response to detection of one or more users by the one or more of the sensor modules, wherein each of the sensor modules in the array is associated with items on the shelving unit and each of the sensor modules in the array comprises an image detector that is configured to detect an amount of time spent by one or more users in front of an item on the shelving unit;

detect, from the optical sensing data, a continued presence of the one or more users within range of the one or more of the sensor modules, for a first period of time;

identify, from the optical sensing data, that at least one of the one or more users is located in front of a first item for an amount of time and removes the first item from the shelving unit;

determine a probability that the first item is viewed and ultimately removed from the facility without monitoring transactions at a plurality of point-of-sale terminals by comparing the amount of time that the at least one of the one or more users is located in front of a first item to a threshold time value determined based on a logistic curve;

update an inventory record in a database in response to comparing the probability to a probability threshold and determining the probability is greater than the probability threshold, the inventory record corresponding to the first item;

determine, responsive to the updating of the inventory record, whether the inventory record satisfies an inventory threshold; and generate a replenishment signal, responsive to the determining, to notify a third party system to provide a quantity of the first item to the facility.

12. The computer readable medium of claim 11, wherein the third party system is associated with a peer retailer, a distribution center, or a vendor.

13. The computer readable medium of claim 11, wherein each of the sensor modules includes a near-field communications transmitter for intercommunication between neighboring ones of the sensor modules in the array.

14. The computer readable medium of claim 11, wherein a spacing between the sensor modules on the shelving unit is determined by an average dimension of items in a category corresponding to the items.

\* \* \* \* \*

UNITED STATES PATENT AND TRADEMARK OFFICE
CERTIFICATE OF CORRECTION

PATENT NO. : 12,051,040 B2
APPLICATION NO. : 17/845164
DATED : July 30, 2024
INVENTOR(S) : Somedip Karmakar It is certified that error appears in the above-identified patent and that said Letters Patent is hereby corrected as shown below:

On the Title Page

In Item (57), under "Abstract", in Column 2, Line 1, delete "An" and insert -- A --, therefor.

On Page 3 in Item (56), under "Other Publication", in Column 6, Line 17, delete "Pop Soilutions" and insert -- Pop Solutions --, therefor.

In the Claims

In Column 14, Claim 8, Line 53, delete "sensors" and insert -- sensor --, therefor.

Signed and Sealed this
Twelfth Day of November, 2024

Katherine Kelly Vidal
*Director of the United States Patent and Trademark Office*